(12) United States Patent
Yasuda et al.

(10) Patent No.: US 7,114,075 B1
(45) Date of Patent: Sep. 26, 2006

(54) USER AUTHENTICATION APPARATUS, METHOD OF USER AUTHENTICATION, AND STORAGE MEDIUM THEREFOR

(75) Inventors: Hideto Yasuda, Mishimo (JP); Tomohito Osawa, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/542,908

(22) Filed: Apr. 4, 2000

(30) Foreign Application Priority Data

Jul. 12, 1999 (JP) .................... 11-198061

(51) Int. Cl.
*H04L 9/00* (2006.01)
*H04K 1/00* (2006.01)

(52) U.S. Cl. .................... 713/182; 713/172; 713/173; 726/2; 726/3; 726/27; 726/28; 715/741

(58) Field of Classification Search ............... 713/182, 713/155–159, 200, 172, 173; 379/142.05; 902/26; 705/72, 41, 67, 75; 709/226; 708/131; 726/2, 27, 28–3; 715/741, 743
See application file for complete search history.

(56) References Cited

U.S. PATENT DOCUMENTS

| | | | | | |
|---|---|---|---|---|---|
| 5,611,048 | A | * | 3/1997 | Jacobs et al. | 713/202 |
| 5,655,077 | A | * | 8/1997 | Jones et al. | 713/201 |
| 5,684,950 | A | * | 11/1997 | Dare et al. | 713/201 |
| 5,872,915 | A | * | 2/1999 | Dykes et al. | 713/202 |
| 5,943,423 | A | * | 8/1999 | Muftic | 705/67 |
| 6,006,333 | A | * | 12/1999 | Nielsen | 713/202 |
| 6,038,551 | A | * | 3/2000 | Barlow et al. | 705/41 |
| 6,178,511 | B1 | * | 1/2001 | Cohen et al. | 713/201 |
| 6,247,129 | B1 | * | 6/2001 | Keathley et al. | 713/156 |
| 6,367,011 | B1 | * | 4/2002 | Lee et al. | 713/172 |
| 6,629,246 | B1 | * | 9/2003 | Gadi | 713/202 |
| 6,681,017 | B1 | * | 1/2004 | Matias et al. | 380/277 |
| 6,745,327 | B1 | * | 6/2004 | Messing | 713/170 |
| 6,775,782 | B1 | * | 8/2004 | Buros et al. | 726/2 |
| 6,801,999 | B1 | * | 10/2004 | Venkatesan et al. | 713/167 |
| 6,829,711 | B1 | * | 12/2004 | Kwok et al. | 713/183 |
| 2002/0007454 | A1 | * | 1/2002 | Tarpenning et al. | 713/156 |

FOREIGN PATENT DOCUMENTS

| | | |
|---|---|---|
| JP | 7-64911 | 3/1995 |
| JP | 10-63722 | 3/1998 |
| JP | 11-65443 | 3/1999 |

\* cited by examiner

*Primary Examiner*—Kim Vu
*Assistant Examiner*—Beemnet W. Dada
(74) *Attorney, Agent, or Firm*—Staas & Halsey LLP

(57) ABSTRACT

Apparatus of the present invention comprises a control unit controlling comparison of identifying information input by a user with identifying information stored in a storage medium, which also stores authentication information for applications corresponding to the stored identifying information. The apparatus also comprises a set unit setting, as input information for authentication system of one of the applications, the authentication information the storage medium sends to the set unit responsive to a result of the comparison.

6 Claims, 14 Drawing Sheets (a)

(b)

(c)

(d)

| APPLICATION ID | USER ID | PASSWORD | DOMAIN | EXTENSION FLAG |
|---|---|---|---|---|
| EXTENSION ID | EXTENSION DATA || | EXTENSION FLAG |

FIG. 14

USER AUTHENTICATION APPARATUS, METHOD OF USER AUTHENTICATION, AND STORAGE MEDIUM THEREFOR

This application is related to and claims priority to Japanese Patent Application No. 11-198061, filed Jul. 12, 1999 in Japan, the contents of which are incorporated herein by reference.

BACKGROUND OF THE INVENTION

1. Field of the Invention

The present invention relates to user authentication for allowing use of apparatus, systems and services.

2. Description of the Related Art

In recent years, improvement in the maintenance of networks and lower hardware prices, such as for personal computers and communication apparatuses, have established an environment in which any person can easily transmit or receive electronic mail (hereinafter referred to as E-mail) through the Internet or to read WWW (World Wide Web) information in various places such as houses, companies and outdoor areas.

More particularly, in any company, there is an attempt to quickly and effectively process jobs through an intranet and an extranet by implementing a client/server type job system utilizing networks, in addition to existing host centralized job systems, which mainly consist of a main frame.

As explained above, currently it is possible for anyone to utilize various kinds of electronic systems in houses and companies. However, in these systems, a user is requested, at the time of using a service of a system, to input a characteristic ID and a password so that the system can perform an authentication process for determining whether or not the user has the qualification to receive the service by referencing the characteristic ID and password information input by the user.

Moreover, even an operating system (OS) of a personal computer performs the authentication process utilizing the ID and password to restrict the user or to change settings for various environments.

As explained above, the user must prepare and remember multiple sets of ID and password corresponding to each system to utilize various systems, applications, services, including WWW pages and/or sites (hereinafter, collectively referred to as an application) in houses, outdoor areas and companies.

When a small number of applications are used, the user is capable of memorizing the ID and password, but when the user utilizes a plurality of applications, the user may forget the ID and password.

To avoid the event, in which the user cannot utilize the application because the user has forgotten the ID and password, many users have generally introduced an operation mode which requires the user to write the ID and password on a note pad, including a digital note pad, for the authentication process.

In addition, companies have generally introduced an operation mode in which magnetic cards in which an employee number information is recorded and distributed to employees and the authentication process is executed using such magnetic cards.

As an example of another related art, there is a Japanese Published Unexamined Patent Application No. HEI 7-64911, in which reliability is reinforced and sufficient authentication is assured.

This reference discloses a system having a host computer and a plurality of terminals connected thereto, whereby an IC card or a magnetic card is designed to store a plurality of personal authentication data (identifying information, password, handwriting and finger print or the like). Each terminal is provided with a keyboard and tablet, a magnetic card reader and an IC card reader for inputting the plurality of personal authentication data. Selected personal authentication data are input for the purpose of comparison or authentication.

As explained above, the operation mode in which the ID and password written on the note pad are input during the authentication process creates a problem in that contents of the note pad may be read by another person and the ID and password may be leaked such that the application can be used illegally or by unauthorized users.

Moreover, while the authentication process utilizing the magnetic card has the benefit that manipulation by the user can be done easily because it is only required for the card reader to read the magnetic card, the authentication process may be done even when a person other than the true card holder causes the card reader to read the magnetic card. As a result, security level is rather low and illegal access to the system cannot be prevented.

In addition, the reference HEI 7-64911 provides higher security by utilizing a plurality of personal authentication data, improving security for one application. However, the authentication process disclosed in HEI 7-64911 does not improve the security for more than one application and does not simplify the authentication manipulation by the users.

SUMMARY OF THE INVENTION

Therefore, it is an object of the present invention to provide an authentication control apparatus, system or storage medium simplifying manipulation or use of a plurality of applications by a user and for improving security in an environment using the plurality of applications.

According to the present invention, a user is required to memorize only one piece of identifying information for accessing more than one application and is freed from memorizing authentication information of all the applications the user desires to access or use. Further, comparison of the identifying information for user authentication is performed by using a storage medium such that the apparatus according to the present invention issues or generates a comparison request to the storage medium for user authentication and receives the result of the comparison (authentication) from the storage medium. Therefore, in the present invention the apparatus does not directly access the storage medium to read authentication information of the applications, which improves security of the authentication information stored in the storage medium for achieving a high level security.

Further, a similar operation effect can be attained with a program according to the present invention instructing a computer to execute the processes explained above.

As explained above, a user can utilize a plurality of applications by memorizing only one identifying information and therefore it is now possible to prevent another person from directly accessing the authentication information of the applications and tapping into the applications.

Further, since the authentication information stored in the storage medium can be updated by only a single input, some input procedures for updating the authentication information can be saved or eliminated.

In view of attaining the objects explained above, an apparatus of the present invention for user authentication comprises a control unit controlling comparison (authentication) of identifying information input by a user with identifying information stored in a storage medium, which also stores authentication information for a plurality of applications corresponding to the stored identifying information. The apparatus of the present invention further includes a setting unit setting or supplying the stored authentication information for an object application or target application selected from the plurality of applications depending on or responsive to the result of the comparison as input information for authentication system of the object application or target application for user authentication.

Moreover, the apparatus of the present invention comprises a control unit controlling comparison (authentication) of identifying information input by a user with identifying information stored in a storage medium, which also stores authentication information for a plurality of applications corresponding to the stored identifying information. The apparatus of the present invention further includes an update control unit controlling, depending on or responsive to the result of the comparison, update of the stored authentication information for an object application or target application to a new authentication information input by the user, and an update processing unit synchronously updating the stored authentication information using the newly input authentication information.

Moreover, the apparatus of the present invention comprises a control unit controlling comparison (authentication) of identifying information input by a user with identifying information stored in a storage medium, which also stores certificates for a plurality of applications corresponding to the stored identifying information. The apparatus of the present invention further includes an instructing unit to instruct, depending on or responsive to the result of the comparison, reading of a desired certificate from the plurality of stored certificates and a providing unit providing the certificate read from the storage medium to an object application or target application for authentication.

Moreover, the present invention may be structured by an authentication control system comprising the apparatuses and the storage medium explained above.

Moreover, the storage medium according to the present invention may be a portable storage medium, such as a IC card or a hand-held terminal, comprising an interface unit sending or receiving information to/from an external side and a memory unit storing sets of application identifying information and corresponding authentication information. The memory unit also stores information of the storage medium. The storage unit further includes a comparing unit comparing identifying information supplied from the external side with the identifying information stored in the storage medium and a processing unit providing, depending on or responsive to the result of the comparison, the authentication information for an object application or target application.

Moreover, a program controls a computer apparatus to perform a process according to the present invention including controlling the comparison of identifying information input by a user with identifying information stored in a storage medium, which also stores authentication information for a plurality of applications corresponding to the stored identifying information. The program controls the computer apparatus to further perform a process including setting or supplying the stored authentication information for an object application or target application selected from the plurality of applications depending on or responsive to the result of the comparison as input information for authentication system of the object application or target application for user authentication.

Moreover, a program controls a computer apparatus to perform a process according to the present invention including controlling comparison of identifying information input by a user with identifying information stored in a storage medium, which also stores authentication information for a plurality of applications corresponding to the stored identifying information. The program controls the computer apparatus to further perform a process including controlling, depending on the result of the comparison, update of the stored authentication information for an object application or target application to a new authentication information input by the user, and an update processing unit synchronously updating the stored authentication information using the newly input authentication information.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 14 is a diagram illustrating the format of data recorded in the memory unit of the IC card.

DESCRIPTION OF THE PREFERRED EMBODIMENTS

Figure 1:
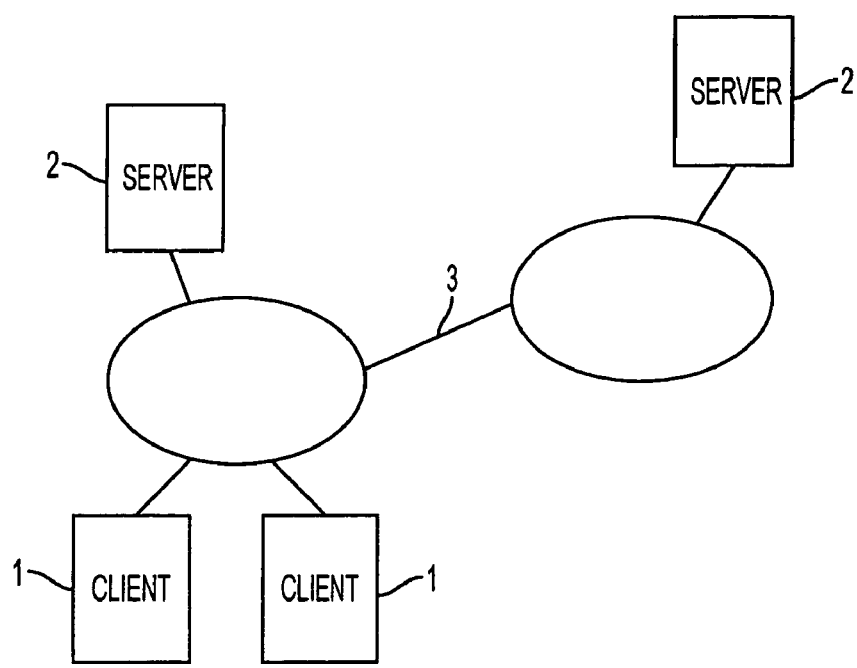
FIG. 1 is a system configuration diagram of the present invention.

Reference will now be made in detail to the preferred embodiments of the present invention, examples of which are illustrated in the accompanying drawings, wherein like reference numerals refer to the like elements throughout.

The embodiments are described below to explain the present invention by referring to the figures.

In this embodiment, a client/server system connected to a network will be explained as an example. Here, it is also possible to use a host centralized type system, which is mainly composed of a main frame in place of the client/server system of this example.

FIG. 1 is a system configuration diagram of the present invention.

As illustrated in FIG. 1, a client 1 is connected to a server 2 via the network 3. The client 1 accesses the server 2 through the network 3 to perform jobs utilizing application software on the server 2 and to download data from the server 2.

Figure 2:
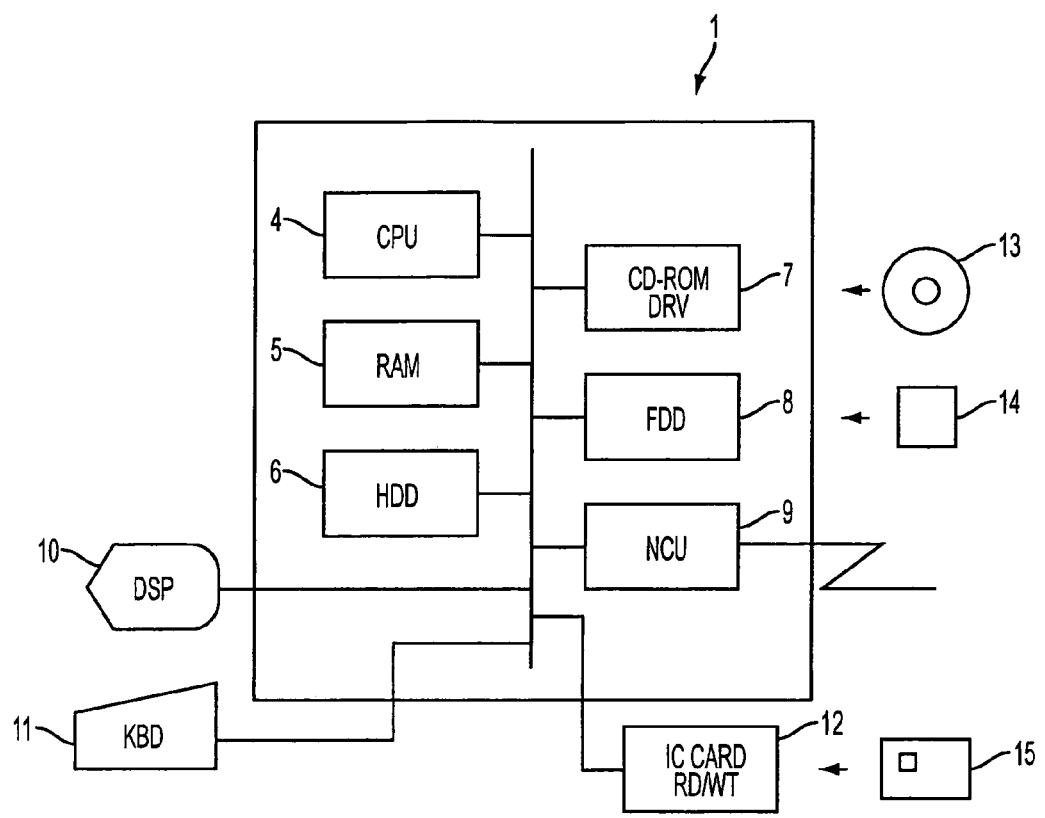
FIG. 2 is a diagram illustrating the schematic structure of the computer.

FIG. 2 is a diagram illustrating a schematic structure of a computer provided as the client 1.

The client 1 is mainly composed of CPU 4, RAM 5, HDD (hard disk drive) 6, CD-ROM drive 7, FDD (floppy disk drive) 8, NCU (network control unit) 9, display unit 10, keyboard 11 and IC card reader/writer 12.

In this figure, various programs use the CPU 4 to execute various processes and controls. Programs of the present invention also use the CPU 4 to execute processes and controls according to the present invention.

Moreover, RAM 5 temporarily stores for the CPU 4 the data, such as the programs of the present invention and information according to the present invention, of various processes and controls and also stores the data for the display unit 10 to display the data.

The hard disk drive 6 and the floppy disk drive 8 record the data, such as the programs of the present invention and the information according to the present invention, to a non-volatile storage media (the hard disk and the floppy disk 14) and read the data from the storage media.

The CD-ROM drive 7 reads the data stored in the CD-ROM 13.

The network control unit 9 is connected to the network 3 to exchange the data with other apparatuses, such as other clients, via the network 3. With this network control unit 9, the data can be exchanged with the server 2 via the network 3.

This network control unit may be a modem or a LAN card. Moreover, this unit may also be used to download the data, such as the program of the present invention and the information according to the present invention, from the server 2 and to receive services provided by the server 2.

The programs of the present invention which are driven or executed in the client 1 can be read respectively by the CD-ROM drive 7 and the floppy disk drive 8 from the CD-ROM 13 and the floppy disk 14 on which the programs are recorded and can be installed on the hard disk drive 6.

In addition, it is also possible that the programs of the present invention are downloaded from the other apparatuses via the network using the network control unit and the programs are then stored in the hard disk drive 6.

The programs of the present invention stored in the hard disk drive 6, as explained above, are loaded into the RAM 5 to execute instructions and operate to realize each structural element of the present invention with the computer as the client.

As explained above, it is also possible that the programs of the present invention are downloaded from the other apparatuses via the network and directly loaded in RAM 5, instead of recording the programs in the storage medium of the hard disk drive 6.

The display unit 10 displays the data stored in the RAM 5 on a display area. The keyboard 11 is an input device for mainly inputting character information by the users. Although not illustrated in FIG. 1, a mouse is also provided to manipulate a mouse cursor displayed on the display area of the display unit 10.

The IC card reader/writer 12 reads and writes the data from/to an IC card 15 (also called a smart card). This IC card 15 is provided, for example, with an integrated circuit (IC) on a plastic card. This integrated circuit includes contacts for electrical connection with the IC card reader/writer 12, a processing unit executing various processes and a memory unit for storing the data.

In this example, the IC card reader/writer 12 and IC card 15 are physically in contact with each other to read or write the data, but it is also possible to use the non-contact type IC card reader/writer and IC card.

As in the case of the client 1, programs of the present invention are also stored in the memory unit of the IC card 15 to operate or execute the processes of the present invention by controlling the processing unit of IC card 15.

The processes executed by the programs of the present invention will be explained in detail.

First, as an example, processes to authenticate the user by displaying a log-on image, with a predetermined input field for authentication information and inputting ID and password will be explained with reference to FIG. 3 to FIG. 6. The log-on image is displayed at a time of starting an OS in an initial stage before providing services or access.

Figure 3:
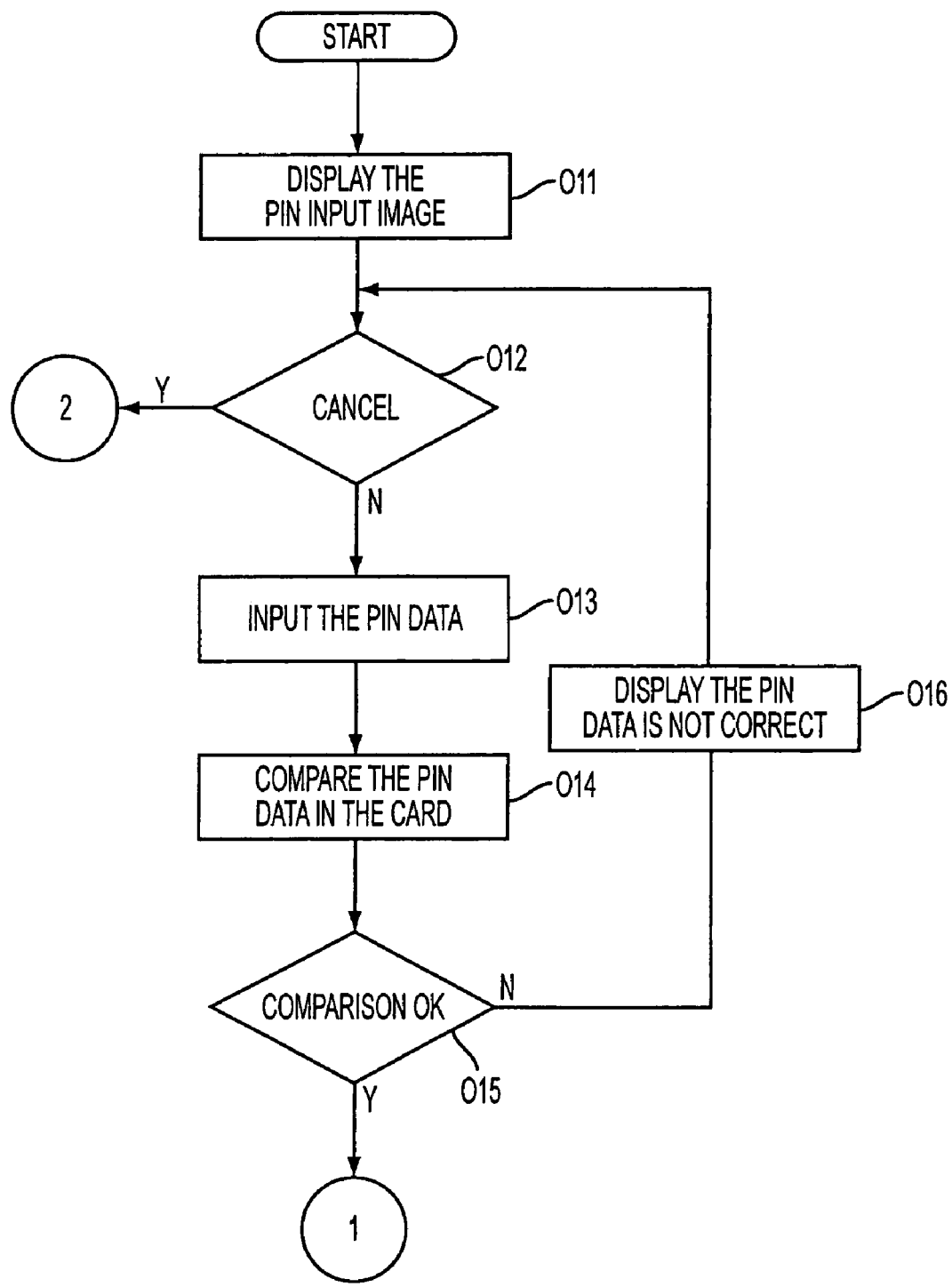
FIG. 3 is a process flowchart (No. 1) for explaining the authentication process in this embodiment.
Figure 4:
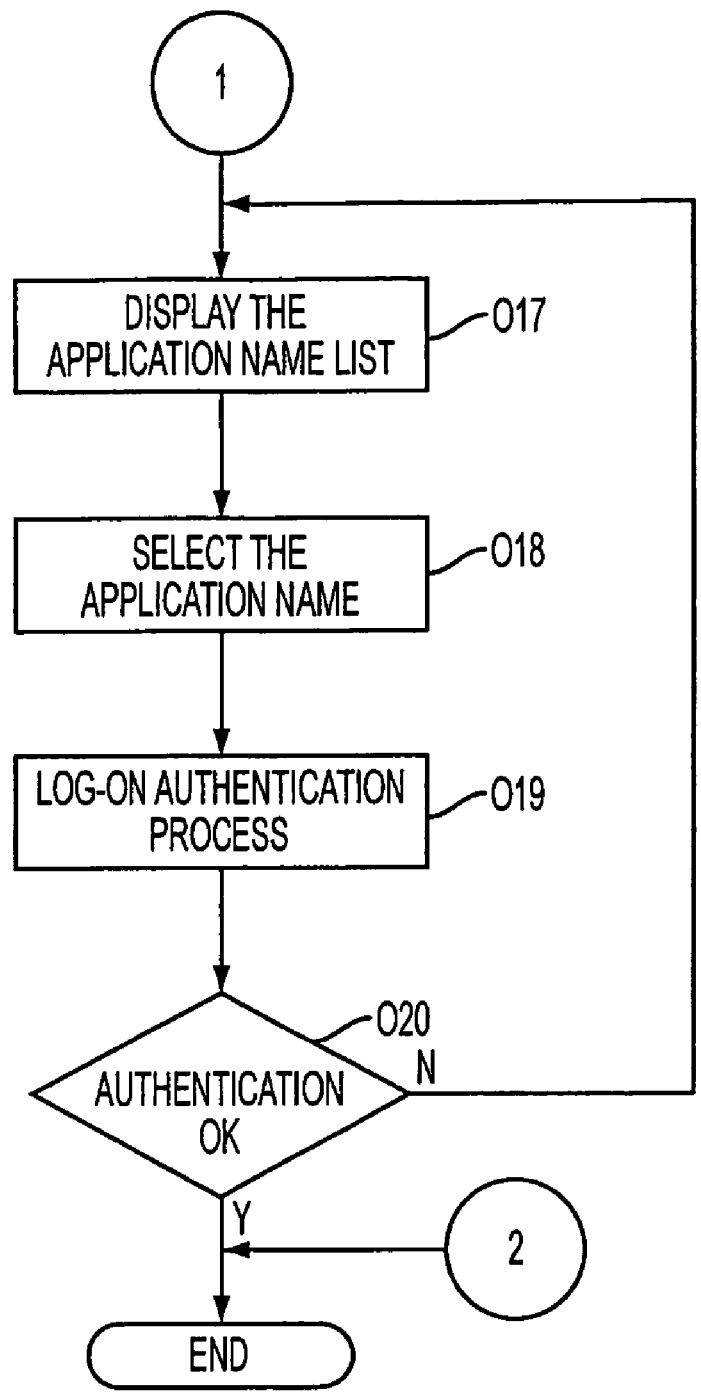
FIG. 4 is a process flowchart (No. 2) for explaining the authentication process in this embodiment.

FIG. 3 and FIG. 4 are process flowcharts explaining an authentication process according to an embodiment of this invention.

Figure 5:
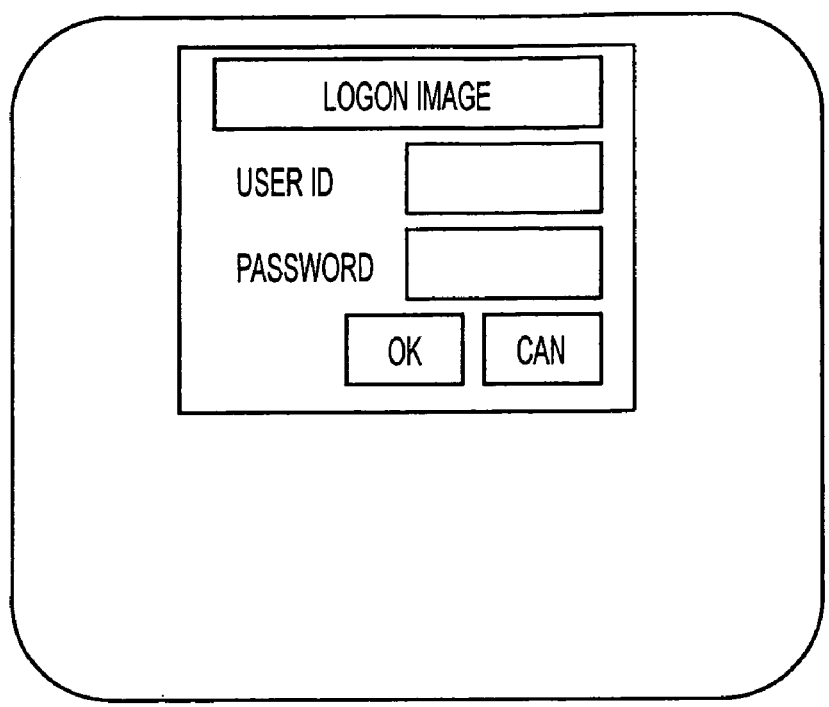
FIG. 5 is a diagram (No. 1) illustrating transition of displays in the authentication process.
Figure 5:
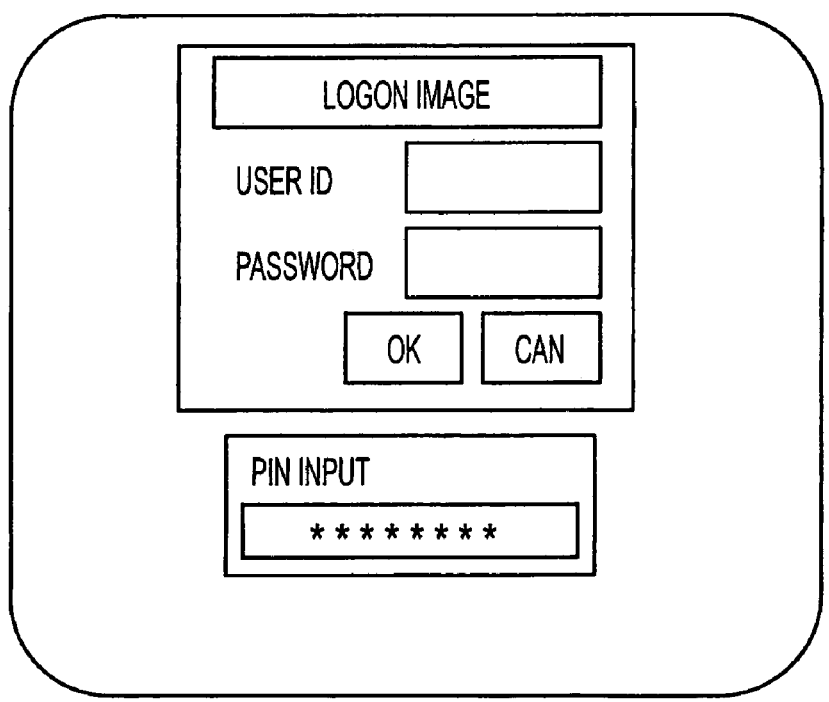
Figure 6:
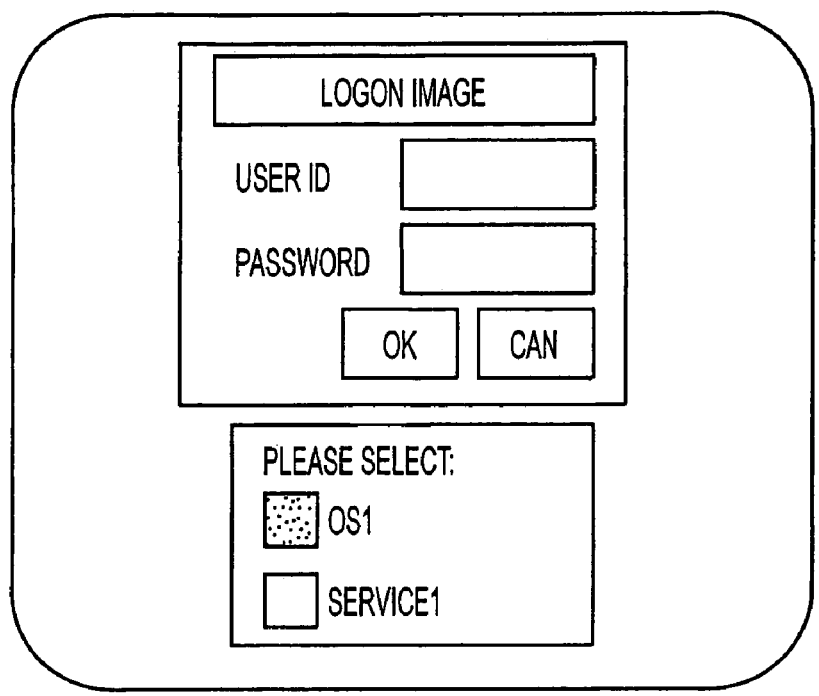
FIG. 6 is a diagram (No. 2) illustrating transition of displays in the authentication process.
Figure 6:
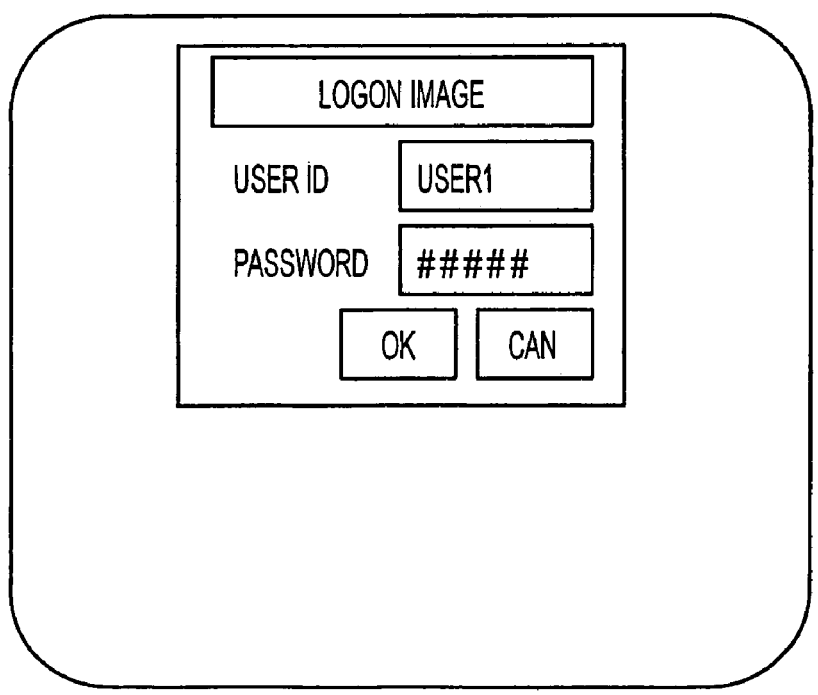

Moreover, FIG. 5 and FIG. 6 illustrate transition of display images in the authentication process.

First, when the log-on image is displayed for inputting the authentication information (FIG. 5(*a*)), an image for inputting personal identifying information (hereinafter referred to as PIN) is displayed (O11, FIG. 5(*b*)).

Display of the PIN input image may be triggered by detecting that the log-on image has been displayed or by detecting that a display instruction button (not illustrated in FIG. 5) is manipulated by the user.

When the user indicates that the authentication process should be canceled, while the PIN input image is displayed (O12), the authentication process is canceled, which completes or terminates the authentication process. If the user inputs the PIN in the PIN input image using the keyboard 11 to complete the required input; the input PIN is supplied to the IC card 15 (O13).

In the IC card 15, the input PIN supplied from the client 1 is compared with the PIN stored in the memory unit (O14).

If, after the comparison (authentication) (O14), the PIN input by the user does not match the PIN stored in the memory unit, mismatching information is transmitted to the client.

Upon reception of the mismatching information from the IC card 15, the client 1 displays, on the display area, a message indicating that the PIN input by the user is not correct (O15, O16).

If the PIN input by the user matches the PIN stored in the memory unit, the IC card 15 transmits matching information to the client to set the client to a condition for allowing the client subsequent access to the IC card 15.

Once the client receives the PIN matching information from the IC card 15, the client requests a list of application names stored in records of the memory unit of the IC card 15. The IC card 15 receives such request, then reads the application names stored in the records of the memory unit and supplies the application names to the client.

The client receives the application names from the IC card 15 and displays the application names on the display area as selection items (O17, FIG. 6(*c*)).

The user selects one of the application names and performs a selection determining manipulation (O18).

When the user selects the one application name, the client supplies the selected application name to the IC card 15 and requests the authentication information corresponding to the selected application name. In this case, the list of selection items displayed on the display area is erased.

The IC card 15 receives the selected application name and the request to read the authentication information corresponding to the selected application name. The IC card 15 determines if the selected application name matches one of the application names stored in the records of the memory unit. If the selected application name matches one of the application names stored in the records of the memory unit, the IC card 15 reads the authentication information corresponding to the selected application and supplies the read authentication information to the client.

The client receives the authentication information supplied from the IC card 15 and sets the received authentication information to the predetermined input field of the log-on image (FIG. 6(*d*)).

When the authentication information is set to or placed in the input field of the log-on image, the user executes a determining manipulation.

When input of the authentication information is established or complete, the selected application conducts or performs an authentication process (comparison process) (O19).

If a result of the authentication process of O19 provides that the authentication information of the selected application matches the input authentication information, the log-on process of the selected application is executed (O20).

Moreover, if the authentication information of the selected application does not match the input authentication information, the list of the application names displayed in O17 is displayed on the display area to execute again the processes of O18 to O20.

As explained above, according to this embodiment of the present invention, it is possible to set the authentication information for the application in the log-on input field by only inputting the PIN from the user and then selecting the desired application from the list of application names read from the IC card 15 and displayed on the display area.

Accordingly, a user can use more than one application by only memorizing one identifying information, such as the PIN. Further, since only the processing unit of the IC card can read the data stored in the memory unit of the IC card, tapping by other persons to access the data stored in the memory unit of the IC card can be prevented.

In the above example, the application displays the log-on image for requesting or inputting the authentication information. However, the present invention is never limited thereto and the present invention can also be applied to a password input image, for example, during recovery from a screen saver to prevent burning of a display screen of the display unit. Generally, the present invention can be applied to any application requiring input of the user ID and the password.

In above example, the user selects the desired application from the list of application names. However, if the client can obtain identifying information of the current application displaying the log-on image, the client can request the authentication information of the application displaying the log-on image from the IC card 15 based on the obtained identifying information. In this case, the client requests the authentication information of the application displaying the log-on image after the IC card 15 permits the client subsequent access to the IC card 15 depending on the comparison (authentication) of the PIN input by the user with the PIN stored in the IC card 15.

Thereby, the process of displaying the list of application names and the process of requesting the user to select one of the application names may be saved or eliminated.

An update process will be explained next comprising synchronizing the authentication information managed by the application with the authentication information stored in the IC card when updating the authentication information.

Figure 7:
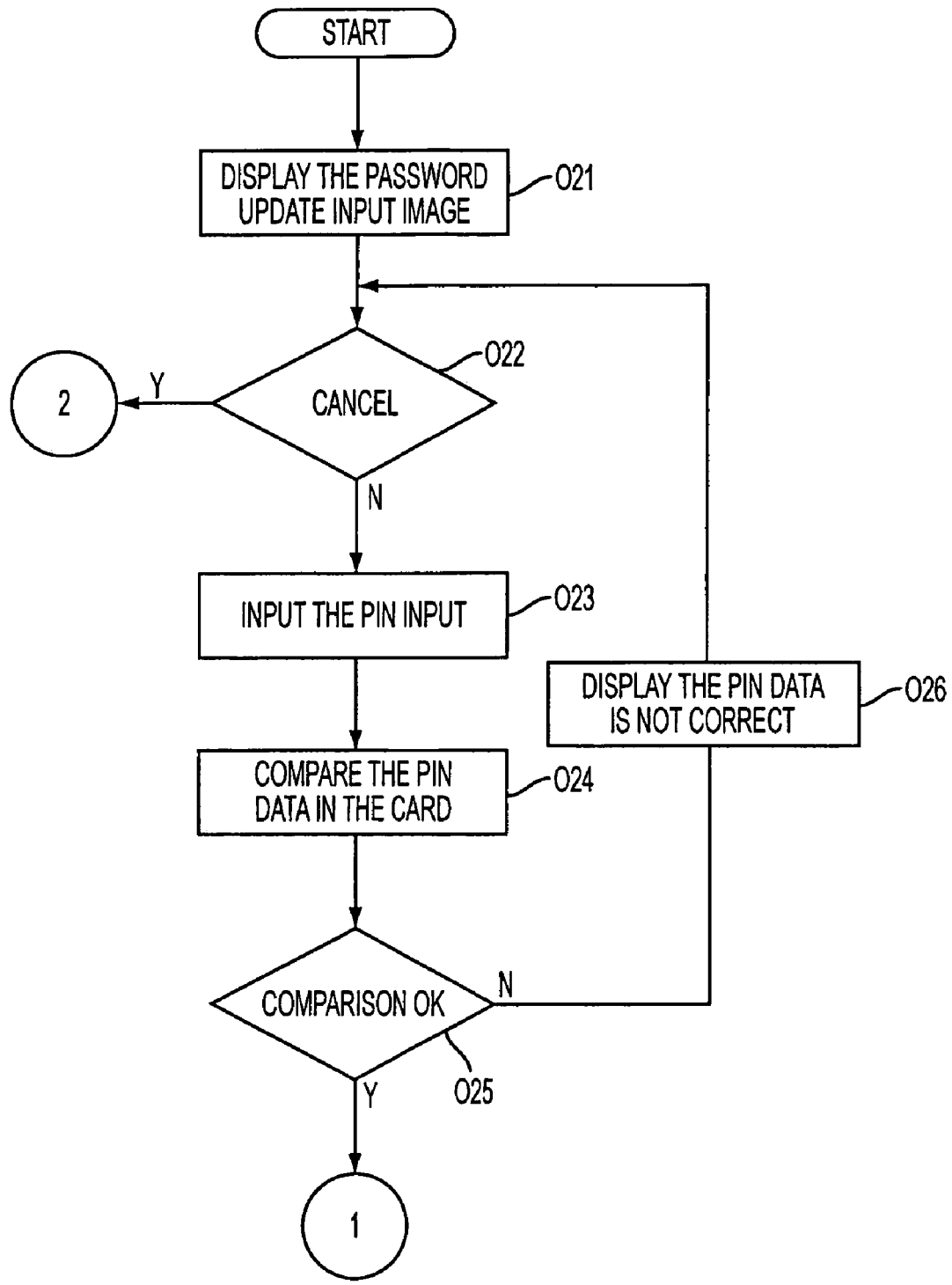
FIG. 7 is a process flowchart (No. 1) for explaining the update process of the authentication information in this embodiment.
Figure 8:
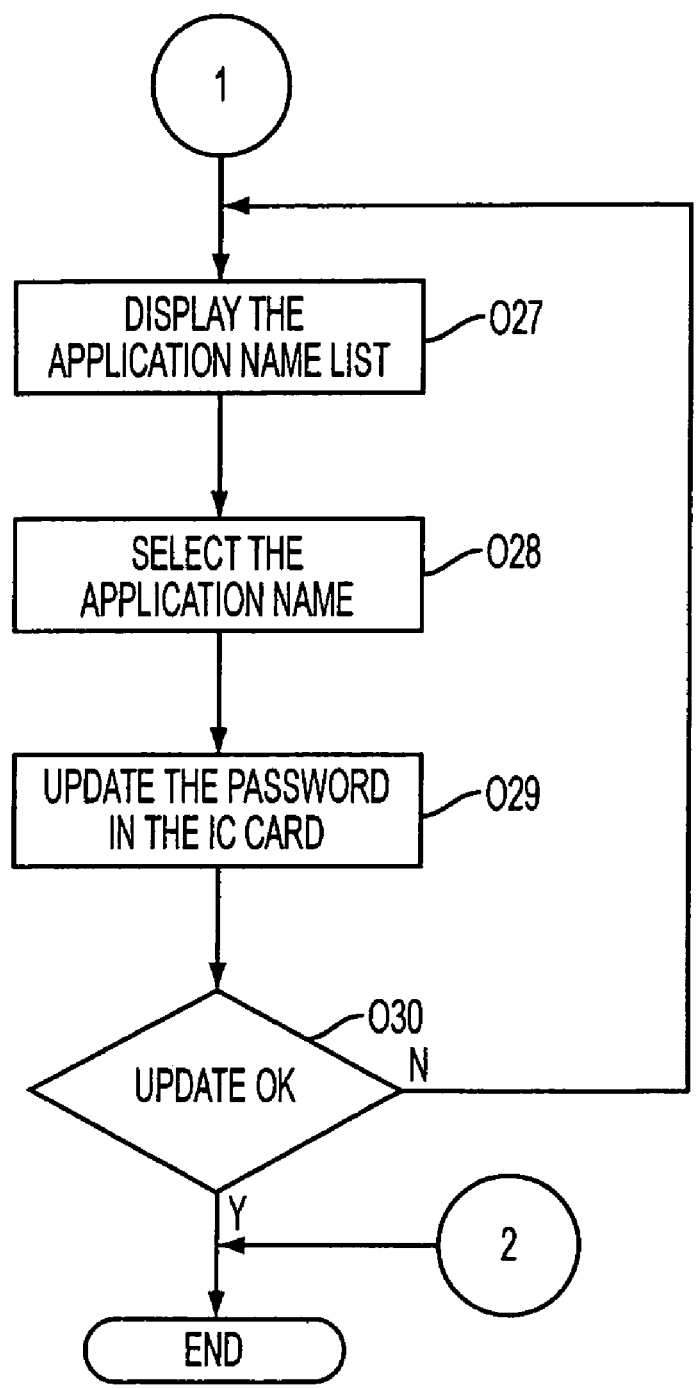
FIG. 8 is a process flowchart (No. 2) for explaining the update process of the authentication information in this embodiment.
Figure 9:
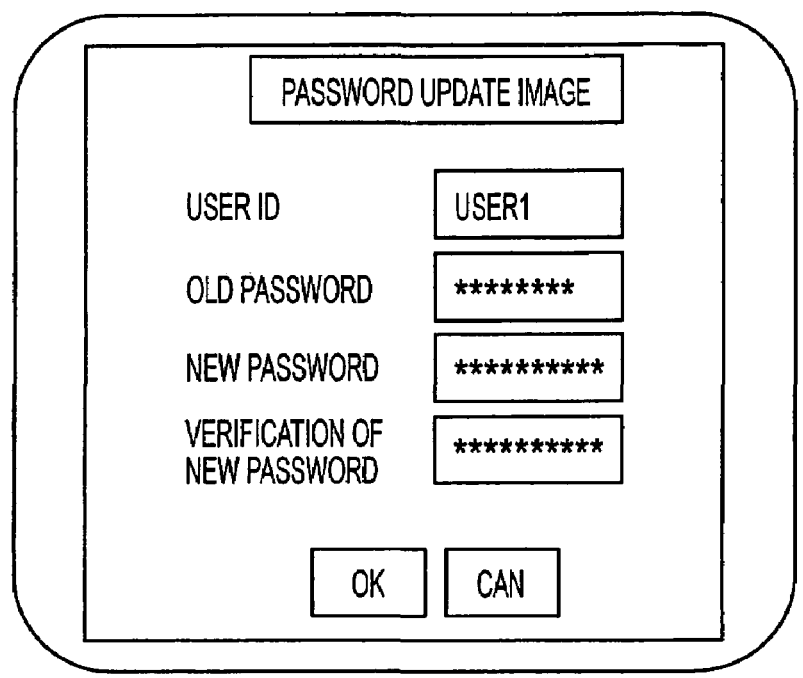
FIG. 9 is a diagram illustrating a display example in the update process of the authentication information.

FIG. 7 and FIG. 8 process flowcharts explain the update process. Moreover, FIG. 9 illustrates a display image in the update process.

First, when the application displays an update input image to update the password, the PIN input image is also displayed (O21).

The display of the PIN input image can be triggered by detecting that the application has displayed an existing password update input image prepared in the application or by detecting that the application has displayed an exclusive password update input image.

If the user instructs the application to cancel, while the application displays the PIN input image (O22), the application cancels the update process, completing or terminating the update process. If the user inputs the PIN in the PIN input image to instruct completion of input, the input PIN is supplied to the IC card 15 (O23).

In the IC card 15, the PIN supplied from the client is compared with the PIN stored in the memory unit (O24).

If after the comparison (O24) the input PIN by the user does not match the PIN stored in the memory unit of the IC card 15 (O25), the mismatching information is transmitted to the client.

The client receives the mismatching information from the IC card 15 and immediately displays, on the display area, the message indicating that the input PIN by the user is not correct (O26).

If the input PIN matches the PIN stored in the memory unit of the IC card 15, the IC card 15 transmits the matching information to the client to set the client to the condition for allowing the client subsequent access to the IC card 15.

Once the client receives the matching information from the IC card 15, the client makes effective or activates input fields of the password update input image of FIG. 9.

The user respectively inputs an old password, a new password and the new password again for verification as input information in the activated input fields of the password update input image and the user manipulates the determining buttons inputting the input information.

When the input information is determined for updating the password, the update process is executed and the client requests from the IC card 5 the list of application names stored in the IC card 15. The IC card 15 receives such request, then reads the application names stored in the records of the memory unit and supplies the application names to the client.

The client receives the application names from the IC card 15 and displays the application names on the display area as selection items (O27).

The user selects the application name currently displaying the update input image for which the user desires to update the authentication information and execute the selection determining manipulation (O28).

When the user selects the application name, each password information input by the user together with the selected application name is supplied to the IC card 15 as an update request. In this case, the list of selection items displayed on the display area is erased.

The IC card 15 receives the update request and if the old password information input by the user matches a current password information in the password information field of the record for the selected application, the IC card 15 updates the password information field of the record for the selected application with the new password (O29).

If the old password information of the selected application input by the user (O30) does not match the current password information in the password information field of the record for the selected application, the application name list displayed in O27 is displayed on the display area to execute again the processes O28 to O30.

With the processes explained above, the password of the application and the password of the application stored in the records of the memory unit of the IC card 15 can be updated by a single input of information by the user. Therefore, some input procedures for updating the application password by the user can be saved.

Next, an example of using certificates stored into the IC card 15 will be explained.

Each certificate is called a secret key, which is used, for example, by a data encryption application in a WWW server to read secured or protected Web pages of a WWW browser.

Figure 10:
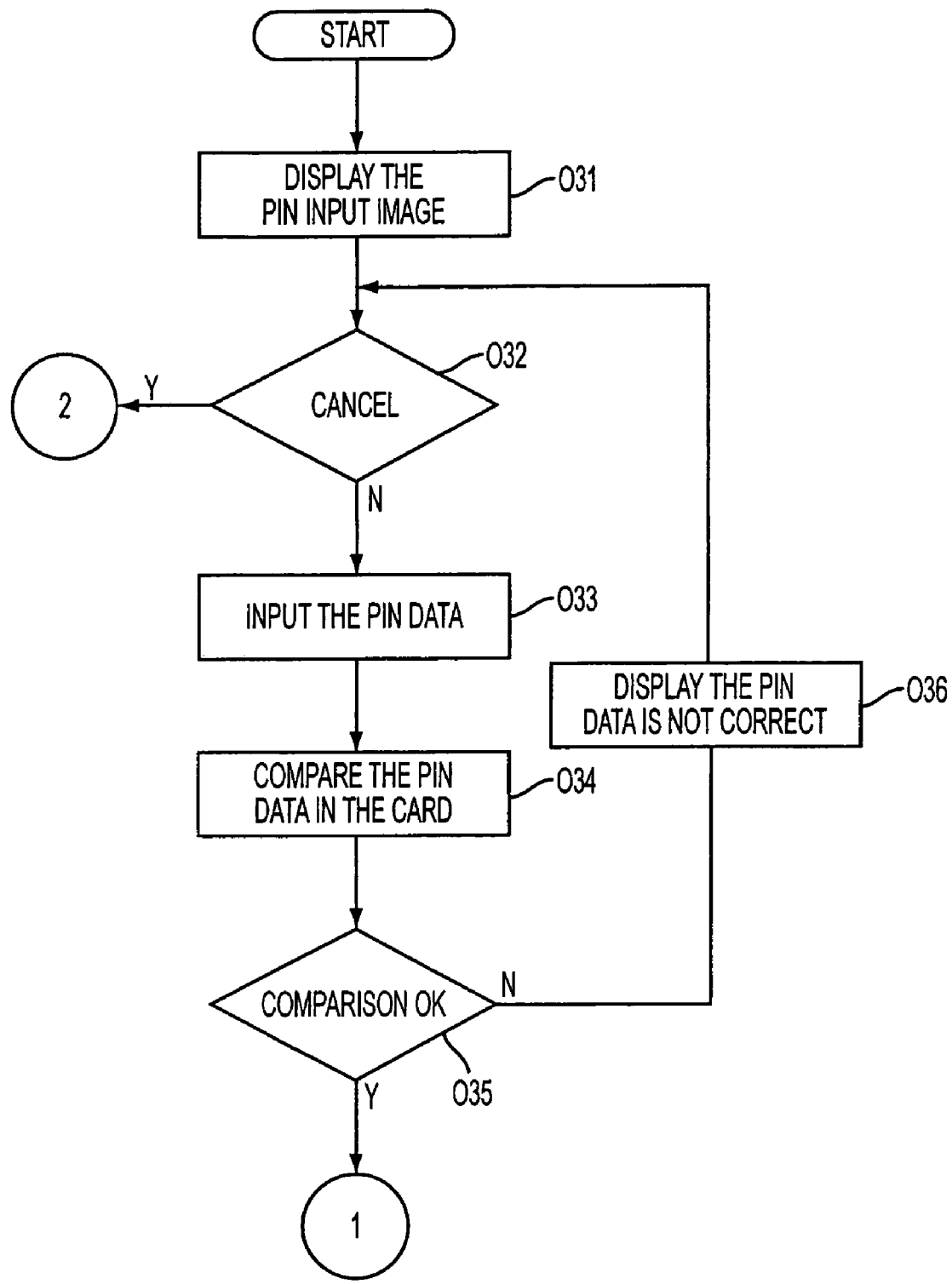
FIG. 10 is a process flowchart (No. 1) when the certificate is used at the time of reading the page protected by security.
Figure 11:
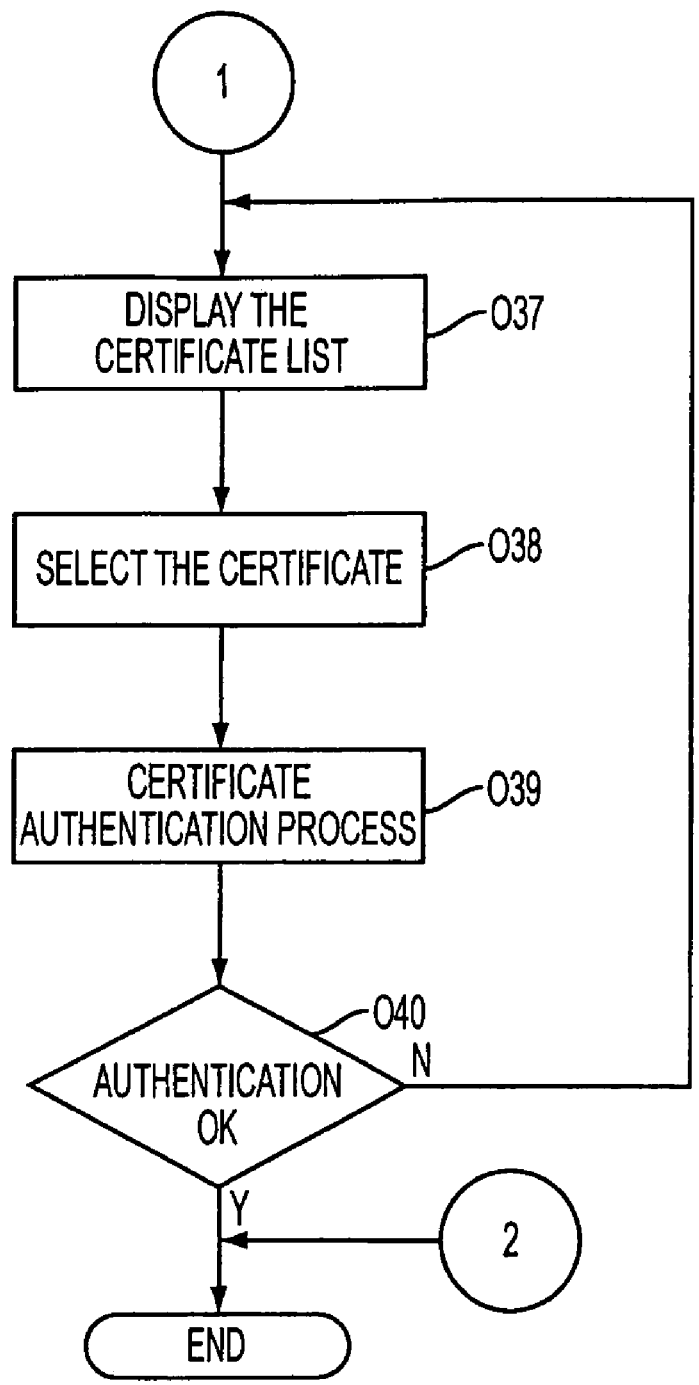
FIG. 11 is a process flowchart (No. 2) when the certificate is used at the time of reading the page protected by security.

FIG. 10 and FIG. 11 are process flowcharts for using the certificate at a time of reading the protected Web pages of the WWW browser.

Figure 12:
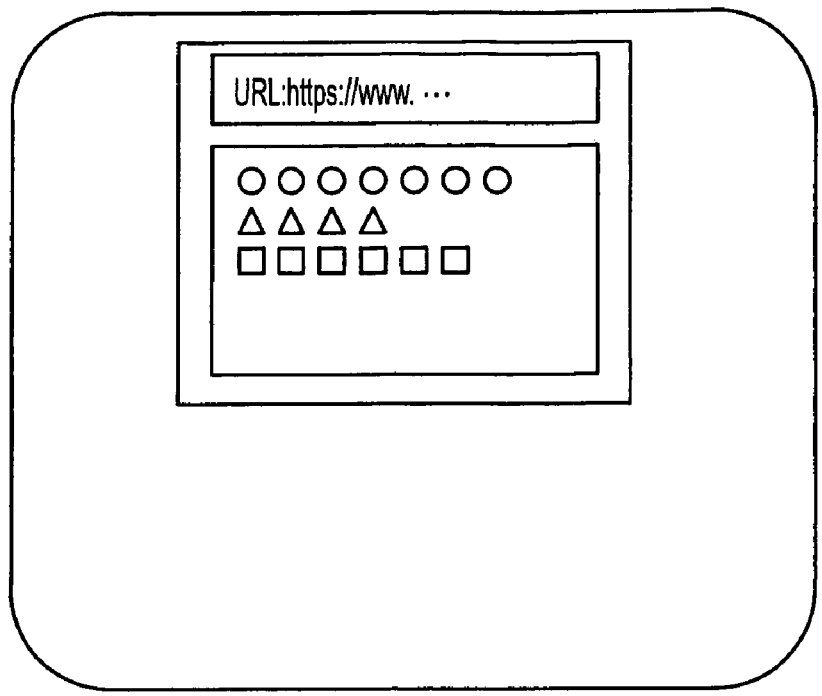
FIG. 12 is a diagram (No. 1) illustrating transition of displays at the time of reading the Web site.
Figure 12:
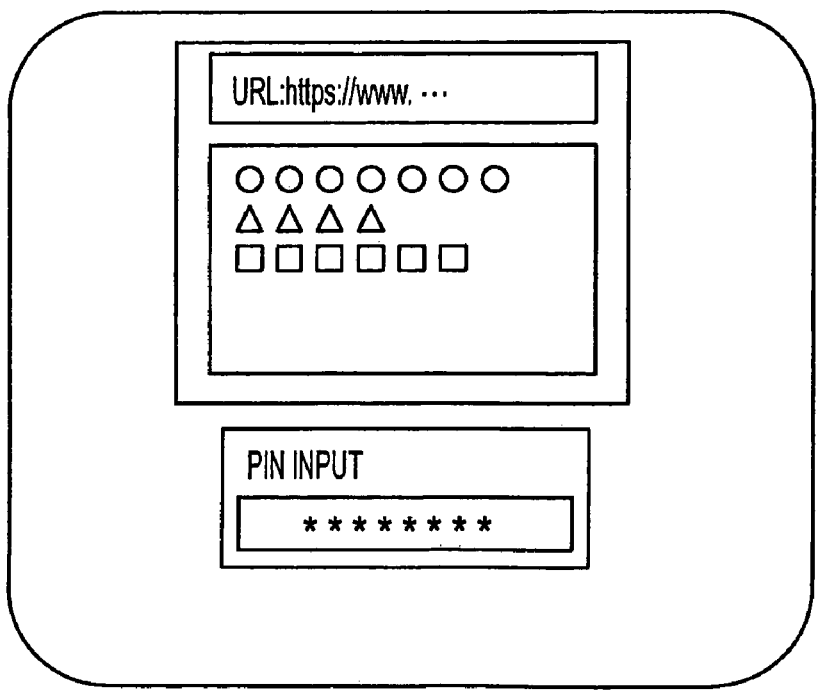
Figure 13:
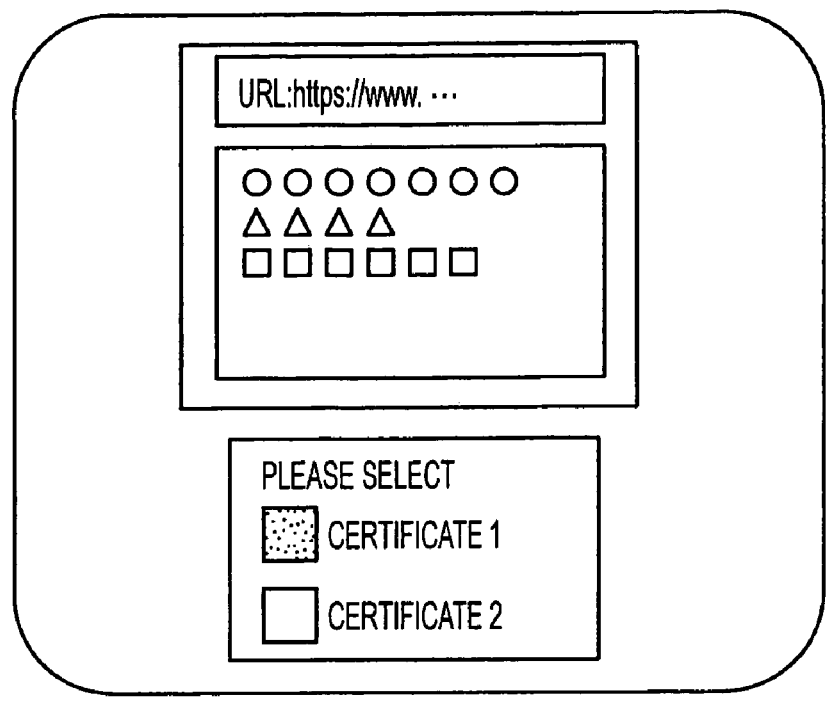
FIG. 13 is a diagram (No. 2) illustrating transition of displays at the time of reading the Web site.
Figure 13:
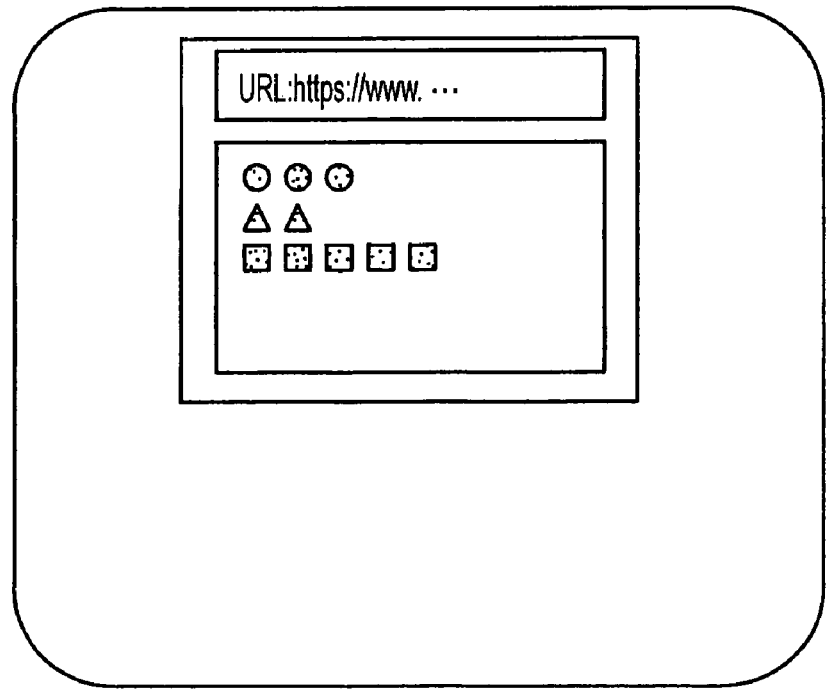

Moreover, FIG. 12 and FIG. 13 illustrate transition display images for reading a Web site.

First, when uniform resource locator (URL) of the page protected by security of the WWW browser is directly input or a link is designated, the WWW browser requests input of the certificate (FIG. 12(*a*)).

When the WWW browser issues this certificate request, the user sets the IC card 15 in the IC card reader/writer 12.

When the IC card 15 is set, the PIN input image displayed (O31, FIG. 12(*b*)).

If the user instructs the application to cancel while the PIN input image is displayed (O32), the authentication process is canceled, completing or terminating the authentication process. If the user inputs the PIN in the PIN input image to instruct completion of input, the input PIN is supplied to the IC card 15 (O33).

In the IC card 15, the PIN supplied from the client is compared with the PIN stored in the memory unit (O34).

If after the comparison (O34) the input PIN by the user does not match the PIN stored in the memory unit of the IC card 15, the mismatching information is transmitted to the client.

The client receives the mismatching information from the IC card 15 and displays on the display area the message indicating that the input PIN by the user is not correct (O35, O36).

If the input PIN by the user matches the PIN stored in the memory unit of the IC card 15, the IC card 15 transmits the matching information to the client to set the client to the condition for allowing the client subsequent access to the IC card 15.

The client receives the matching information from the IC card 15 and immediately requests a list of certificate names stored in the IC card 15.

The IC card 15 receives this request and reads information about the certificates stored in the memory unit and then supplies the information about the certificates to the client.

The client receives the information about the certificate names from the IC card 15 and displays such information as the selection items on the display area (O37, FIG. 13(*c*)).

The user selects the certificate name corresponding to the WWW page and executes the selection determining manipulation (O38).

When the user selects the certificate name, the client supplies the information about the selected certificate name to the IC card 15 and requests the IC card 15 to read certificate data corresponding to the selected certificate name. In this case, the selection item list displayed on the display area is erased.

The IC card 15 receives the request to read the information about the selected certificate name and the certificate data and reads the information and the certificate data matched with the request from each record of the memory unit and then supplies the information and the certificate data to the client.

The client receives the certificate data supplied from the IC card 15 and executes the authentication process using the certificate data (O39).

If the authentication process O39 is correct, the protected WWW page is displayed (O40).

If the certificate data is not correct, the list of certificate names displayed in O37 is displayed on the display area to execute again the processes of O38 to O40.

As explained above, the certificate data is recorded on a portable type storage medium such as the IC card 15 without preparing or storing the certificate data in the client and such certificate data is used as required by reading from the storage medium. Thereby, the protected WWW page cannot be read when the storage medium storing the certificate data is not available even if another person uses the client, achieving a high level security.

Finally, format of data stored in the memory unit of the IC card 15 will be explained.

FIG. 14 illustrates a format of data stored in the memory unit of IC card.

The memory unit of IC card 15 stores records corresponding to the applications.

Each record is formed of an application ID, a user ID, the password, a domain and an extension field.

The application ID field stores information identifying the application. Using this information, the client generates the selection item list and this information is a key for reading the authentication information.

The user ID field stores the user ID corresponding to the application.

The password field stores the password forming a pair with the user ID corresponding to the application.

The domain field stores information which is not used for explaining the processes according to this invention but is used for log-on to the server.

The extension field stores information indicating whether extension information continues in the next record.

Next, an authentication controlling apparatus according to the present invention will be explained. The authentication controlling apparatus according to the present invention comprises a control unit controlling comparison of the identifying information input by the user with the identifying information stored in the storage medium, which also stores the authentication information, including certificates, for the applications corresponding to the stored identifying information. The apparatus further comprises a setting unit setting, as input information for authentication system of one of the applications, authentication information of the one application the storage medium send responsive to the result of the comparison (authentication) to the setting unit.

In another embodiment, the setting unit sets the stored authentication information for the selected application responsive to the result of the comparison as input information to the selected application for user authentication. The apparatus further comprises a providing unit providing the identifying information input by the user to the storage medium and a receiving unit to receive the result of the comparison (authentication) of the input identifying information with the identifying information stored in the storage medium performed by a comparing unit in the storage medium.

According to another aspect of the present invention the authentication controlling apparatus comprises a display unit displaying the application names as the selection items when the result of the comparison (authentication) indicates that the identifying information input by the user matches the identifying information stored in the storage medium. The authentication controlling apparatus further comprises a selecting unit controlling selection of the object application as the selected application from the selection items, wherein the setting unit sets the stored authentication information for the selected application depending on the result of the comparison as input information to the selected application for user authentication.

According to another aspect of the present invention the authentication controlling apparatus comprises a requesting unit controlling transmission of read requests to the storage medium to read the information stored in the records of the storage medium, wherein the display unit displays as the selection items the read information about the applications stored in the records of the storage medium.

The computer readable storage medium according to the present invention stores a program instructing the computer to perform a process comprising comparing the identifying information input by the user with the identifying information stored in the storage medium, storing in the records of the storage medium authentication information about the applications, selecting one of the applications and setting the stored authentication information for the selected application depending on the result of the comparison as input information to the selected application for user authentication. The process further comprises providing the identifying information input by the user to the storage medium and receiving the result of the comparison of the identifying information input by the user with the identifying information performed by the comparing unit of the storage medium. The process further comprises displaying the application names as the selection items when matching is the result of the comparison and controlling selection of the application from the selection items.

The present invention is never limited to the embodiments explained above and may be changed or modified within the scope not departing from the spirit of the present invention, the scope of which is defined in the claims and their equivalents.

What is claimed is:

1. An integrated circuit card storing authentication information used to authenticate a user, comprising:
    an interface unit exchanging information with an external device of the user;
    a memory unit storing certificates to access protected web pages received by the external device and processed by the external device;
    a memory unit storing characteristic identifying information of the user associated with the protected web pages received by the external device;
    a comparing unit comparing identifying information received from the external device with the characteristic identifying information of the user stored in the memory unit of the integrated circuit card, in response to issuance of a certificate request by the web browser to a user; and
    a processing unit to display on the external device selectable names of protected applications as protected web pages, if a result of the comparing of the user identifying information is matching and to supply one of the certificates that corresponds to a protected application selected by the user to access the protected application received by the external device.

2. A user authentication computer system, comprising:
    a computer, comprising:
        an integrated circuit card reader,
        a display unit, and
        a programmed computer processor communicating with a network and executing, in the computer, a web browser that processes a protected web page received from the network, the web browser issuing a certificate request to a user, in response to the receipt of the protected web page by the web browser from the network: and
    an integrated circuit card readable by the integrated circuit card reader and storing a certificate to access the protected web page received in the computer and storing characteristic identifying information of a user associated with the web page, and storing at least one program performing a process comprising:
        comparing identifying information input by the user with the user characteristic identifying information stored on the integrated circuit card, in response to the issuing of the certificate request by the web browser to the user,
        displaying on the display unit selectable names of protected applications as protected web pages, if a result of the comparing of the user identifying information is matching, and
        providing one of a plurality of certificates stored on the integrated circuit card and corresponding to a selected one of the protected applications by the user to the web browser to access the selected protected application.

3. The computer system of claim 2, wherein the integrated circuit card stores information about the protected applications and the selectable names of the protected applications are provided to be displayed on the display unit, if the result of the comparing of the user identifying information is matching.

4. A process of user authentication in a client computing apparatus, comprising:
    executing, in the client computing apparatus, a web browser that processes a protected web page to be received from network;
    storing on an integrated circuit card a certificate to access the protected web page received in the client computing apparatus and characteristic identifying information of a user:
    issuing by the web browser a certificate request to the user, in response to the receipt of the protected web page by the web browser of the client computing apparatus;

reading by an integrated circuit card reader the integrated circuit card, in response to the issuing of the certificate request by the web browser;

comparing identifying information input by the user with the characteristic identifying information of the user stored in the integrated circuit card;

displaying, by the integrated circuit, on a display unit selectable names of protected applications, as protected web pages received in the client computing apparatus, if a result of the comparing of the user identifying information is matching; and providing to the web browser of the client computing apparatus, one of a plurality of certificates stored on the integrated circuit card that corresponds to a selected one of the protected applications by the user to access, by the client computing apparatus, the selected protected application.

5. The process of claim 4, further comprising storing in the integrated circuit card information about the protected applications, and providing the selectable names of the protected applications to be displayed on the display unit, if the result of the comparing of the user identifying information is matching.

6. The process of claim 4, further comprising:

storing, in the integrated circuit card, an application identifier identifying a protected application to display a selectable name of the protected application, and a user identifier and password as the characteristic identifying information of the user associated with the protected applications as the protected web pages received in the client computing apparatus.

* * * * *

UNITED STATES PATENT AND TRADEMARK OFFICE
CERTIFICATE OF CORRECTION

| | | |
|---|---|---|
| PATENT NO. | : 7,114,075 B1 | Page 1 of 1 |
| APPLICATION NO. | : 09/542908 | |
| DATED | : September 26, 2006 | |
| INVENTOR(S) | : Hideto Yasuda et al. | |

It is certified that error appears in the above-identified patent and that said Letters Patent is hereby corrected as shown below:

Title Page, Column 1 (Inventors), Line 1, After "Yasuda," change "Mishimo" to --Kawasaki--.

Column 12, Line 27, change "network:" to --network;--.

Column 12, Line 63, change "user:" to --user;--.

Signed and Sealed this

Tenth Day of April, 2007

JON W. DUDAS
*Director of the United States Patent and Trademark Office*